(No Model.)
D. COMFORT.
SEAL LOCK.
No. 570,907. Patented Nov. 10, 1896.
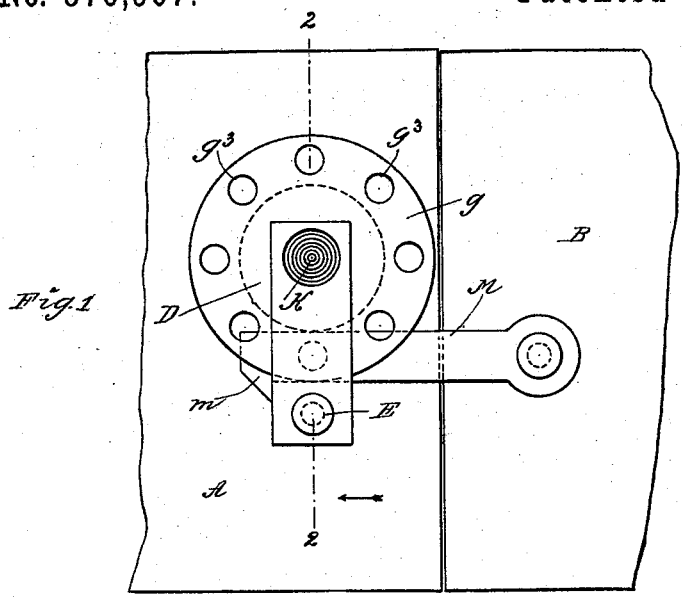
Fig. 1.
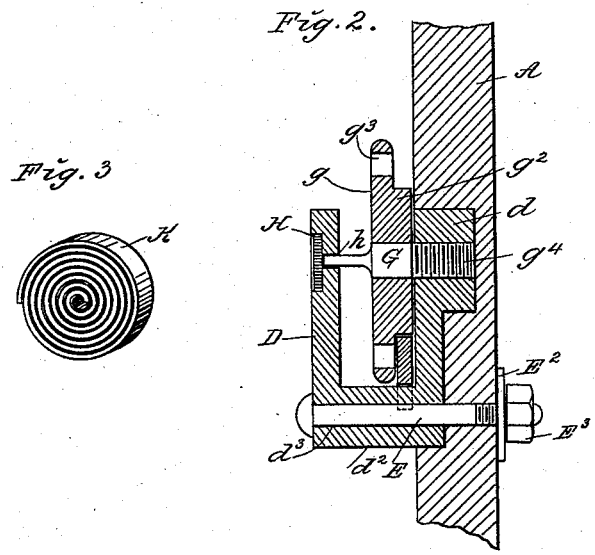
Fig. 2.
Fig. 3.
WITNESS:
INVENTOR
David Comfort,
BY
Edgar Tate
ATTORNEYS.

UNITED STATES PATENT OFFICE.

DAVID COMFORT, OF ALBANY, GEORGIA.

SEAL-LOCK.

SPECIFICATION forming part of Letters Patent No. 570,907, dated November 10, 1896.

Application filed April 22, 1896. Serial No. 588,591. (No model.)

*To all whom it may concern:*

Be it known that I, DAVID COMFORT, a citizen of the United States, and a resident of Albany, in the county of Dougherty and State of Georgia, have invented certain new and useful Improvements in Seals for Cars, of which the following is a specification, reference being had to the accompanying drawings, forming a part thereof, in which similar letters of reference indicate corresponding parts.

This invention relates to means for sealing cars; and the object thereof is to provide an effective device of this class which is simple in construction and operation, which may be easily applied to a car, and which is also comparatively inexpensive.

The invention is fully disclosed in the following specification, of which the accompanying drawings form a part, in which—

Figure 1 is a side view of a section of the body of a car and showing also a section of a car-door with my improved seal connected therewith; Fig. 2, a section on the line 2 2, and Fig. 3 a perspective view of a detail of the construction.

In the drawings forming part of this specification, A represents a portion of the body of a car, and B a part of a sliding car-door, and in the practice of my invention I provide a yoke D, one side of which is provided with a head $d$, and the cross-head $d^2$ of the yoke D is provided with a transverse bore or passage $d^3$, through which passes a bolt E, by which the yoke D is secured to the body of the car, said bolt E being provided with a washer $E^2$ and a nut or bur $E^3$. I also provide a shaft G, on which is rigidly mounted a disk or wheel $g$, which is provided on its inner side with a circular hub $g^2$, and which is also provided near its outer edge with transverse holes or openings $g^3$, which are arranged in a circle therein and which are so provided for the purpose of securing a grip of the wheel and thus being able to turn the same.

The shaft G is screw-threaded at its inner end, as shown at $g^4$, and connected with the head $d$ of the yoke D, through which it passes, and the outer arm or side of the yoke D is provided with a circular cavity or chamber H, and the outer end of the shaft G is reduced in size and passed through said outer arm or side of the yoke, as shown at $h$, and the circular cavity or chamber H is adapted to be filled by spiral-coil seal K, which is composed of lead and which is adapted to be forced thereinto.

The spiral-coil seal K may be fastened in the chamber H by applying a hot iron to the seal, thereby causing it, since it is made of lead, to fuse and thus hold fast in the said chamber.

Pivotally connected with the door B is a latch or lock-bar M, the outer end of which is provided with an outwardly-directed hook or projection $m$, and the operation will be readily understood when taken in connection with the accompanying drawings.

It will be observed that the side of the yoke D which is provided with a head $d$ is countersunk in the body or frame of the car, as is also the head $d$, and the inner surface of said arm of the yoke on which said head is formed is flush with the outer surface of the side or body of the car to which said yoke is attached.

In order to seal the car, the disk or wheel $g$ is turned so as to screw the shaft G out or partially out of the head $d$, and the latch or lock-bar M is passed through the yoke into the position shown in Figs. 1 and 2, and the shaft G is screwed into the head $d$, as shown in Fig. 2, by turning the wheel $g$, and when the parts are in this position the latch or lock-bar M will be securely locked and the door cannot be opened, the head $m$ of the lock-bar or latch engaging with the head of the yoke and being held in this position by the wheel $g$.

The spiral K of lead is then forced into the circular cavity or chamber H, as shown in Fig. 2, and may be secured therein by fusion, as hereinbefore described. When this is done, it will be impossible to open the car without breaking the spiral seal K, which is placed in the chamber H and against which the outer end of the shaft G comes in contact, and in order to open the car it is necessary to revolve the wheel $g$, so as to draw the shaft G outwardly, and this operation will break the seal, as will be readily understood.

This device is simple in construction and operation and perfectly adapted to accomplish the result for which it is intended, and my invention is not limited to the form, construction, and arrangement of the various parts thereof as herein described, and it is evident that changes therein and modifications thereof may be made without departing from the spirit of my invention.

Having fully described my invention, I claim as new and desire to secure by Letters Patent—

1. In a seal for cars, the combination with a yoke one side of which is provided with a head which is countersunk in the body of the car, and the other side, in its outer surface, with a cavity or recess and a perforation or opening therethrough, of a screw-threaded shaft which is passed through said head, and provided with a wheel or disk which is mounted thereon, and an extension which passes through the perforation or opening in the other arm, said circular cavity or recess being adapted to receive a spiral coil of lead, and a latch or lock-bar which is secured to the door and provided with a head which is adapted to engage with said yoke, substantially as shown and described.

2. In a car-seal, the combination of a yoke, of a cross-head at the lower end of said yoke and at right angles thereto, of a head extending upwardly and integral with said cross-head, said cross-head having a transverse circular opening therein, a shaft adjustably secured in said head, a wheel having openings therein circularly arranged, mounted on said shaft said yoke having a chamber therein, an opening in its central portion through which said shaft G is adapted to pass, a spiral-coil seal adapted to snugly fit in said chamber and a lock-bar pivotally secured at one end to said car and having at its other a head adapted to engage said yoke, substantially as and for the purposes described.

In testimony that I claim the foregoing as my invention I have signed my name, in presence of the subscribing witnesses, this 16th day of April, 1896.

DAVID COMFORT.

Witnesses:
E. N. CLARK,
J. E. BONEY.